US011212150B2

(12) United States Patent
Baldemair et al.

(10) Patent No.: US 11,212,150 B2
(45) Date of Patent: *Dec. 28, 2021

(54) DEMODULATION REFERENCE SIGNALING IN LTE/NR COEXISTENCE

(71) Applicant: Telefonaktiebolaget LM Ericsson (publ), Stockholm (SE)

(72) Inventors: Robert Baldemair, Solna (SE); Arash Ghasemmehdi, Ottawa (CA); Franz Heiser, Järfälla (SE); Fredrik Huss, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,144

(22) Filed: Dec. 18, 2019

(65) Prior Publication Data

US 2020/0136874 A1 Apr. 30, 2020

Related U.S. Application Data

(63) Continuation of application No. 16/402,681, filed on May 3, 2019, now Pat. No. 10,560,297, which is a
(Continued)

(51) Int. Cl.
*H04L 27/26* (2006.01)
*H04W 76/27* (2018.01)
(Continued)

(52) U.S. Cl.
CPC ...... *H04L 27/2613* (2013.01); *H04L 27/2605* (2013.01); *H04W 8/24* (2013.01);
(Continued)

(58) Field of Classification Search
CPC .......... H04L 27/2613; H04L 27/2605; H04W 76/27; H04W 8/24; H04W 72/0446
See application file for complete search history.

(56) References Cited

U.S. PATENT DOCUMENTS 9,369,253 B2 * 6/2016 Pourahmadi .......... H04L 5/0051
9,907,027 B2 * 2/2018 Kim ..................... H04W 52/243
(Continued)

FOREIGN PATENT DOCUMENTS

KR 20180035649 A 4/2018

OTHER PUBLICATIONS

International Search Report and Written Opinion dated Jun. 7, 2019 for International Application No. PCT/SE2018/050961 filed on Sep. 20, 2018, consisting of 15-pages.
(Continued)

*Primary Examiner* — Mohammad S Anwar
(74) *Attorney, Agent, or Firm* — Christopher & Weisberg, P.A.

(57) ABSTRACT

There is disclosed a method of operating a network node, the network node operating according to a first radio access technology, RAT. The method includes transmitting signaling having communication signaling and Demodulation Reference Signaling, DMRS, in a transmission resource pattern. The DMRS is arranged in the transmission resource pattern according to a DMRS pattern, in which the DMRS pattern is selected from a set of DMRS patterns based on a coexistence indication indicating the presence of cell-specific reference signals, CRS, associated to a second RAT.

19 Claims, 4 Drawing Sheets

Related U.S. Application Data continuation of application No. PCT/SE2018/050961, filed on Sep. 20, 2018.

(51) Int. Cl.
  *H04W 8/24* (2009.01)
  *H04W 72/04* (2009.01)
  *H04W 72/12* (2009.01)

(52) U.S. Cl.
  CPC ... *H04W 72/0446* (2013.01); *H04W 72/1257* (2013.01); *H04W 76/27* (2018.02)

(56) References Cited

U.S. PATENT DOCUMENTS

| | | | |
|---|---|---|---|
| 10,349,350 B2 | 7/2019 | Li et al. | |
| 2013/0028217 A1 | 1/2013 | Sumasu et al. | |
| 2013/0235811 A1* | 9/2013 | Li | H04B 7/0452 370/329 |
| 2015/0003356 A1 | 1/2015 | Seo et al. | |
| 2015/0085715 A1 | 3/2015 | Sun et al. | |
| 2016/0182203 A1* | 6/2016 | Fang | H04W 72/04 370/329 |
| 2016/0227521 A1* | 8/2016 | Han | H04L 5/0051 |
| 2018/0026684 A1 | 1/2018 | Wei et al. | |
| 2018/0324767 A1 | 11/2018 | Manolakos et al. | |

OTHER PUBLICATIONS

3GPP TSG RANWG1 NR Ad-Hoc Meeting R1-1700402; Title: Consideration of NR signals and channels mapping around LTE CRS; Agenda Item: 5.1.3.3; Source: Huawei, HiSilicon; Document for: Discussion and decision; Location and Date: Spokane, USA Jan. 16-20, 2017, consisting of 2-pages.

3GPP TSG RAN WG1 Meeting 90bis R1-1718526; Title: Remaining details on synchronization signal design; Agenda Item: 7.1.1; Source: Qualcomm Incorporated; Document for: Discussion/Decision; Location and Date: Prague, Oct. 9-13, 2017, consisting of 8-pages.

3GPP TSG RAN WG1 Meeting 90bis R1-1718406; Title: Rate matching aspects of LTE-NR coexistence and further details on resource sets; Agenda Item: 7.3.5; Source: AT&T; Document for: Discussion/Approval; Location and Date: Prague, CZ, Oct. 9-13, 2017, consisting of 6-pages.

3GPP TSG RAN WG3 Meeting #99 R3-181284; Title: LTE-NR resource allocation coordination over X2; Agenda Item: 10.14.1; Source: Ericsson, Nokia, Nokia Shanghai Bell, AT&T; Document for: Discussions & Approval; Location and Date: Athens, Greece, Feb. 26-Mar. 1, 2018, consisting of 6-pages.

\* cited by examiner

DEMODULATION REFERENCE SIGNALING IN LTE/NR COEXISTENCE

CROSS-REFERENCE TO RELATED APPLICATIONS

This Application is a continuation of U.S. application Ser. No. 16/402,681, filed on May 3, 2019, which is a continuation of International Application No. PCT/SE2018/050961, filed Sep. 20, 2018, the entireties of both of which are incorporated herein by reference.

TECHNICAL FIELD

This disclosure pertains to wireless communication technology, in particular in the context of coexistence of radio access of different technologies.

BACKGROUND

Some radio access technologies like LTE and NR will be operating in the same frequency ranges, requiring approaches allowing coexistence for example such that for overlapping or coordinated cells or transmissions, undesired interference is limited.

SUMMARY

It is an object of the present disclosure to provide approaches facilitating coexistence of different RATs, in particular in the context of reference signals, with little signaling overhead and/or allowing efficient use of available resources.

The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardization organization). A suitable RAN may in particular be a RAN according to NR, for example release 15 or later, or LTE Evolution.

There is disclosed a method of operating a network node, the network node operating according to a first radio access technology, RAT. The method comprises transmitting signaling comprising communication signaling and Demodulation Reference Signaling, DMRS, in a transmission resource pattern. DMRS is arranged in the transmission resource pattern according to a DMRS pattern, the DMRS pattern being selected from a set of DMRS patterns based on a coexistence indication indicating the presence of cell-specific reference signals, CRS, associated to a second RAT.

There is also disclosed a network node adapted for operating according to a first radio access technology, RAT. The network node is adapted for transmitting signaling comprising communication signaling and Demodulation Reference Signaling (DMRS) in a transmission resource pattern. DMRS is arranged in the transmission resource pattern according to a DMRS pattern, the DMRS pattern being selected from a set of DMRS patterns based on a coexistence indication indicating the presence of cell-specific reference signals, CRS, associated to a second RAT. The network node may comprise, and/or be adapted for utilizing, processing circuitry and/or radio circuitry, in particular a transmitter and/or transceiver and/or receiver, for transmitting signaling and/or selecting a pattern like a DMRS pattern and/or for receiving signaling and/or one or more indications, e.g. a coexistence indication and/or capability indication.

Moreover, a method of operating a user equipment (UE) is described. The user equipment operates according to a first radio access technology, RAT. The method comprises receiving signaling comprising communication signaling and Demodulation Reference Signaling, DMRS, based on a transmission resource pattern. Receiving the signaling comprises associating signaling received based on the transmission resource pattern with DMRS based on a DMRS pattern selected from a set of DMRS patterns based on a coordination indication indicating the presence of cell-specific reference signals, CRS, associated to a second RAT.

A user equipment adapted for operating according to a first radio access technology, RAT also is considered. The user equipment is adapted for receiving signaling comprising communication signaling and Demodulation Reference Signaling (DMRS) based on a transmission resource pattern, wherein receiving comprises associating signaling received based on the transmission resource pattern with DMRS based on a DMRS pattern selected from a set of DMRS patterns based on a coordination indication indicating the presence of cell-specific reference signals, CRS, associated to a second RAT. The user equipment may comprise, and/or be adapted for utilizing, processing circuitry and/or radio circuitry, in particular a transceiver and/or receiver, for receiving the signaling and/or associating the DMRS pattern and/or selecting the DMRS pattern.

The approaches described herein facilitate efficient use of time/frequency resources in coexisting RANs, while overlap of important reference signals may be avoided. In particular, for LTE/NR coexistence, communication signaling like PDSCH signaling extending up to the last symbol in a slot may be used without DMRS and CRS interfering, despite normal NR DMRS patterns prescribing overlap for long PDSCH signaling.

Selecting a pattern by a network node or a UE may generally comprise determining the pattern to be selected, e.g. according to an indication or instruction, or independently. Receiving may comprise demodulation and/or decoding signaling, e.g. in particular decoding and/or demodulating the communication signaling based on the DMRS. The transmission resource structure may be scheduled for transmission by the network node, and/or the network node may indicate to the user equipment that the transmission is scheduled, e.g. with a scheduling assignment and/or DCI and/or PDCCH transmission (dynamically), and/or semi-statically and/or higher-layer signaling, e.g. with a RRC configuration. In general, the transmission resource structure may represent (specific) scheduled signaling, e.g. for a specific slot or slot aggregation. It should be noted that the DMRS pattern selected influences the demodulation process of the associated communication signaling, in particular regarding interpolations or extrapolations for communication signaling in neighboring symbols or symbols with communication signaling trailing a last symbol associated with DMRS. In general, a symbol carrying, or intended or schedule or configured to carry DMRS may be considered a symbol associated to DMRS.

It may be considered that the first RAT corresponds to New Radio, NR technology, and the second RAT corresponds to Long Term Evolution, LTE, technology. The DM-RS and CRS may overlap, or overlap in part, in frequency space. The DMRS pattern may be such that DMRS and CRS are disjunct in time domain, e.g. are transmitted or transmittable at different time symbol intervals. A slot may be a slot according to NR RAT.

The DMRS pattern may be selected based on a capability indication indicating the capability of the user equipment to select a DMRS pattern based on a coordination indication. The capability indication may for example explicitly indicate the capability, and/or implicitly indicate it, e.g. indicating a class or type of UE, and/or a manufacturer, in particular a manufacturer of radio circuitry like a baseband chip or similar, and/or a series or time of manufacturing. The network node may be adapted to check the capability indication against a list of capable UEs to determine whether the UE is capable based on the capability indication. The list may be provided in a memory or storage medium accessible to the network node and/or to processing circuitry of the network node.

The signaling, e.g. the communication signaling and/or DMRS, may be embedded in, and/or carried by, the transmission resource structure, e.g. such that resource elements of the resource structure are carrying the signaling, e.g. modulation symbols of the signaling. The signaling may generally be transmitted utilizing, and/or according to, the first RAT.

The communication signaling may be and/or comprise data signaling and/or Physical Downlink Shared Channel, PDSCH, signaling. In some cases, the communication signaling may comprise and/or be control signaling, e.g. PDCCH signaling.

In some cases, the transmission resource structure may have an end symbol (last symbol or symbol time interval of the structure in time domain) which may be arranged in a symbol before an end symbol of a slot, or which may coincide with, and/or corresponds to, the end symbol of a slot, e.g. slot 13 or 6 (counting symbols in a slot from 0).

The transmission resource structure may be embedded into a slot, e.g. scheduled for transmission in a slot, and/or represent a slot or part of a slot. The transmission resource structure generally may represent a slot or part of a slot, e.g. a number of consecutive symbol time intervals of a slot. The transmission resource structure may be mapped to a slot such that symbols of the transmission resource structure coincide and/or correspond to symbols of the slot.

It may be considered that the transmission resource structure may be scheduled to end in, and/or comprise, the last symbol, e.g. symbol 13, of a slot, and/or comprises and/or represents a long communication signaling and/or long Physical Downlink Shared Channel, PDSCH, transmission, which may be scheduled to have a duration from symbol n of a slot to symbol m of a slot, wherein n may be in the range of 1 to 6 and/or may correspond to one of the first half of symbols in a slot, and/or wherein m may be 12 or 13 and/or may represent the last or next-to last symbol of a slot.

The coordination indication and/or capability indication may be provided with higher-layer signaling, e.g. MAC or RRC signaling and/or application-layer signaling. In some cases, the coordination indication and/or capability indication may be provided at random access, e.g. with a first RRC configuration or reconfiguration. The capability indication may be provided with uplink signaling, and/or the coordination indication may be provided with downlink signaling.

The set of DMRS patterns may comprise two or more patterns. Different patterns of the set may differ in at least one position in time or symbol carrying or intended to carry or associated to DMRS. Different DMRS patterns may indicate the same number of symbols carrying DMRS, or in some cases may indicate different numbers of symbols carrying DMRS. A selected DMRS may be a pattern in which symbols carrying DMRS are shifted in time relative to symbols or time intervals carrying CRS of the second RAT. The DMRS patterns may pertain to transmission resource structures with the same duration and/or extension in time domain. For transmission resource structures with the same duration and/or extension in time domain, selecting a communication signaling may be considered equivalent to selecting a DMRS pattern, as a communication pattern may be linked to a corresponding DMRS pattern. For example, within a transmission resource structure, symbols not associated to DMRS may be associated to communication signaling, and vice versa. A selected DMRS pattern may be a pattern that does not include, or prevents, DMRS on symbol 11 of a slot in which the transmission resource structure is embedded, and/or indicates DMRS on symbol 10 and/or 12, in particular for cases in which the same numerologies are used between synchronized RATs. In general, the selected DMRS pattern may be a pattern that does not include, or prevents, DMRS signaling on one or more symbols corresponding to symbols of the second RAT carrying or intended to carry CRS, in particular preventing or not including DMRS on symbols corresponding to or covering symbol 11 of a subframe of the second RAT. DMRS patterns in the set may differ in particular regarding the last symbol (in time domain pertaining to the transmission resource structure and/or a slot it is embedded in) indicated to carry DMRS. For example, the last symbol may be shifted by one symbol time interval, or more than one symbol time interval, between two different patterns. It may be considered that the last symbol indicated to carry DMRS according to the selected DMRS pattern is one symbol time interval later or earlier (e.g., in symbol time intervals of the second RAT) than in at least one other DMRS pattern of the set, e.g. a DMRS pattern to be used when no coexistence is indicated.

A network node may be considered a radio node. Scheduling the transmission resource structure may comprise scheduling the structure for transmission of the signaling or corresponding data in a slot. Transmitting data or signaling based on the transmission resource structure may comprise utilizing resource elements of the transmission resource structure for transmission of associated signaling. Transmitting may comprise encoding and/or modulating of data or reference information. Transmission of the signaling may be indicated to a receiver (e.g., scheduled or configured or allocated), e.g. a user equipment, in particular with control signaling, for example DCI signaling and/or a scheduling assignment. Such indicating may be part of scheduling the transmission resource structure. The transmission resource structure may represent a time-frequency resource structure, which may comprise N1 subcarriers and M1 symbols (symbol time intervals), wherein M1 may be 13 or lower, e.g. between 10 and 13, which may be considered associated to a long transmission. Operating according to a first RAT may be comprise communicating, e.g. transmitting and/or receiving, in a first frequency range, and/or operating according to the second RAT may comprise communicating on a second frequency range. The first range and the second range may at least partly overlap. The first frequency range may correspond to, and/or be embedded in, a carrier bandwidth, or bandwidth part, which may be an active bandwidth part. The second frequency range may in particular be a carrier bandwidth, or in some cases a part thereof. The RATs may be operated or operable in downlink. The transmission resource structure may be scheduled for the first frequency range, and/or extend in frequency domain within the first frequency range and/or the second frequency range. The transmission resource structure may comprise and/or represent transmission on a physical channel, e.g. a shared channel like a PDSCH. The DMRS may be associated to the communication signaling and/or data, e.g. for demodulating and/or decoding modulation symbols carrying the communication signaling or data. Symbols associated to different signalings or sets, e.g. of reference signalings (e.g., DMRS and CRS) may be considered disjunct if no symbol carrying one type of signaling also carries signaling of the other type, wherein types signaling may for example be DMRS and CRS, or reference signaling associated to a first RAT and reference signaling associated to a second RAT, or communication signaling and DMRS. For the frequency domain, disjunct may be analogous with respect to subcarriers instead of symbols. Operating on the first frequency range and the second frequency range may be according to the same numerology, or according to different numerologies. A transmission resource structure may be structured according to the numerology of the first RAT.

The coexistence indication may be received by the network node, e.g. from another network node and/or core network, e.g. via a suitable interface. Alternatively, or additionally, the coexistence indication may be determined by the network node, e.g. based on measurements, e.g. of signaling typical and/or representative for the second RAT, and/or reading from a memory, e.g. if it is preconfigured. The coordination indication may be received by the user equipment, e.g. from a network node, which may be operating according to the first RAT and/or second RAT. Alternatively, or additionally, the coordination indication may be determined by the user equipment, e.g. based on measurements, e.g. of signaling typical and/or representative for the second RAT, and/or reading from a memory. In general, it may be assumed that the network node and/or the user equipment are aware of operation according to the first RAT and second RAT on a common frequency range. Operation according to the first RAT may be such that resources not used for operating according to the second RAT are utilized. A network node operating according to the first RAT may coordinate with, and/or exchange information with, a network node operating according to the second RAT. It should be noted that such nodes could be physically identical devices, or be separated from each other. Data signaling may be represented by transmission of data according to the transmission resource structure. Receiving data based on a transmission resource structure may consider a time delay due to path effects. The transmission resource structure to be received may be indicated to the user equipment, e.g. with control signaling and/or DCI, which in particular may indicate a duration and/or end symbol of the transmission resource structure. Resource elements of the first and/or second set may be included in the transmission resource structure. The transmission resource structure may be associated to, and/or included in a slot. It may be slot-based, or represent a mini-slot. The transmission resource structure may extend in time domain over one or more symbols, in particular it may be longer than 1, 2, 3 or 4 symbols, and/or shorter than 10, 11, 12 or 13 symbols in duration. The coexistence indication and/or the coordination indication may indicate the presence of the cell-specific reference signaling based on indicating operation according to the second RAT, and/or based on explicitly indicating the signaling, and/or indicating the location in time and/or frequency of the cell-specific reference signaling. The UE may obtain the capability information, e.g. reading from a memory and/or from preconfigured or installed information. Communication signaling may in general carry and/or represent data, which may be represented by modulated symbols carrying bits of the data. Coding bits may be associated to data and/or communication signaling. A resource element or subcarrier or symbol carrying a type of signaling, e.g. communication signaling or DMRS, may be a resource element or subcarrier or symbol actually carrying such, or one intended for, or scheduled for, or assumed as carrying such.

A DMRS pattern may indicate in time domain on which symbols (symbol time intervals) DMRS is carried and/or arranged, e.g. within the transmission resource structure, and/or in relation thereto, and/or relative to a slot in which the transmission resource structure is embedded. Communication signaling may be arranged in the transmission resource structure based on a communication pattern, e.g. in time domain. Communication signaling may be disjunct in time domain from DMRS, and/or the DMRS and communication pattern may be disjunct in time domain. However, in some cases, some overlap may be considered, e.g. such that for one symbol time interval, some subcarriers carry communication signaling, and others DMRS. A DMRS pattern may additionally pertain to frequency domain, e.g. indicating which subcarriers carry DMRS. A communication pattern may also pertain to frequency domain, e.g. indicating which subcarriers carry communication signaling. A DMRS pattern may represent one or more combs, e.g. in frequency domain. A comb may generally represent a distribution of subcarriers in which a number N of subcarriers not included in the (frequency domain) pattern, and/or included in a set disjunct (in frequency domain) of the pattern are arranged between subcarriers of the pattern. N may be 0 or larger; in some cases, two or more combs with N1 or N2 may be combined to form a comb of different N3 that is smaller than N1 and N2. In general, the elements of the DMRS pattern may be associated to one or more symbols of the transmission resource structure, e.g. forming a comb for each symbol, wherein combs for different symbols may be the same or different. The pattern may be based on a length and/or location of the transmission resource structure, e.g. a location in a slot. The length or duration of the structure may pertain to the number of symbols it comprises, the location may be relative to the symbols in a slot. A first or starting symbol of the transmission resource structure may coincide with, and/or be located at, a symbol S of the slot, wherein S may in particular be larger than 2 or 3. A last or ending symbol of the structure may coincide with, and/or be located at, a symbol E of the slot, wherein E may be 13. It may be considered that the slot has two more symbols for different signaling, e.g. reference signaling according to the first RAT. A RAT may in general describe a standard of communication, e.g. signaling structures and/or protocols. Operation according to the first RAT and the second RAT may be synchronized, e.g. such that subframe borders or reference symbols of the second RAT coincide with slot borders or reference symbols of the first RAT.

In particular, the first RAT may correspond to New Radio, NR technology, and the second RAT corresponds to Long Term Evolution, LTE, technology. In general, the cell-specific reference signaling may be CRS (Cell-Specific Reference Signaling). The reference signaling may be according to a specific pattern, e.g. as prescribed and/or configured for the operation according to the second RAT.

In general, the resource elements for DMRS may be shifted in time relative to positions of cell-specific reference symbols, e.g. according to the DMRS pattern. It may generally be considered that the location of DMRS in time, e.g. relative to the transmission resource structure and/or a slot, may be dependent on the duration and/or end symbol, respectively the end symbol location in the slot. It may be considered that for different durations and/or end symbols, respectively end symbol locations, the location in time of DM-RS and/or the pattern are different, e.g. according to the first RAT. Accordingly, scheduling the transmission timing structure with a duration and/or end symbol may define a suitable arrangement of DM-RS in time. It may be considered the transmission resource structure is scheduled such that out of a plurality of possible patterns for the second set, and/or locations of resource elements of the second set, a pattern or locations are selected that shift DM-RS in time relative to locations of cell-specific reference signals according to the second RAT.

The DMRS pattern may be punctured in frequency domain, e.g. for one or more symbols. A punctured pattern may comprise, for one or more symbols, at least two subcarriers separated from each other by at least one subcarrier (punctured element) not belonging to the pattern, and/or included in a second pattern disjunct from the pattern. Punctured elements may correspond to resource elements for which cell-specific reference signals according to the second RAT may be expected.

It may be considered that in a slot in which the communication signaling or data is transmitted, there are scheduled channel state information reference signals, e.g. CSI-RS, and/or other reference signals according to the first RAT, after the transmission resource structure and/or included at the end thereof. Such reference signals may, e.g., comprise Tracking Reference Signals and/or beam related signals. Thus, the resources may be used efficiently. The scheduled signals may be transmitted and/or scheduled by the network node, which may be adapted accordingly. The UE may be adapted and/or configured for receiving and/or reporting on the reference signals.

Also, there is considered a program product comprising instructions adapted for causing processing circuitry to control and/or perform a method as described herein. A carrier medium arrangement carrying and/or storing a corresponding program product is proposed.

The coexistence indication may represent the network node's awareness that operation may occur according to the second RAT, e.g. in a common cell and/or section and/or angular or spatial or geographical region. Operation may be such that resources are shared, e.g. such that at instances of time and/or frequency, operation is according to only one RAT. The coordination indication may be analogous for the UE.

The approaches described herein facilitate negative impact of transmission in the first RAT on cell-specific reference signals of the second RAT, which typically are particularly important for operating according to the second RAT. As DMRS position usually has only limited flexibility, and in particular the location in time of DMRS signals in a transmission resource structure may be dependent e.g. on its duration and/or location within a slot, a transmission timing structure may be selected to shift DM-RS in time relative to the cell-specific reference signals. As data may be more flexibly allocated to resource elements, or may be dropped with less dramatic components, interference may be limited and/or avoided.

BRIEF DESCRIPTION OF THE DRAWINGS

The drawings are provided to illustrate concepts and approaches described herein, and are not intended to limit their scope. The drawings comprise.

DETAILED DESCRIPTION

In the following, variants are described in the context of NR/LTE coexistence, however, the approaches may be implemented in different contexts.

Figure 1:
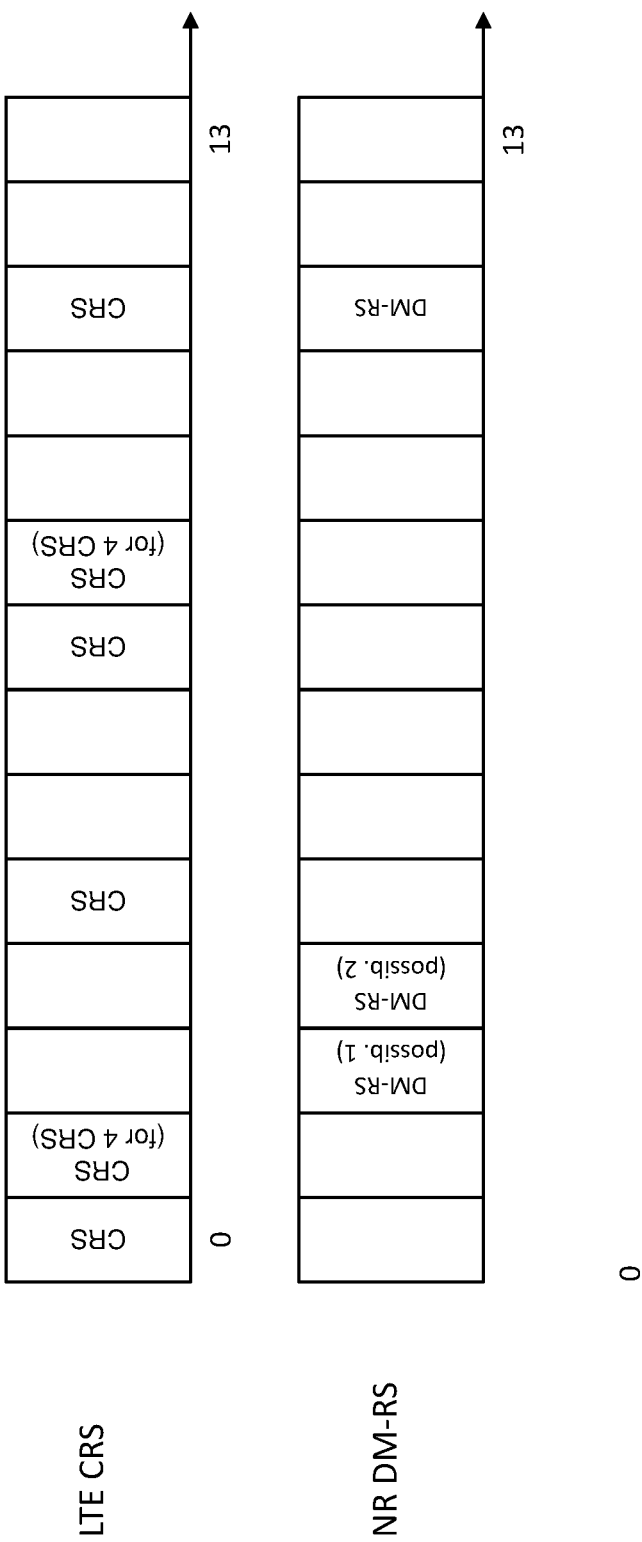
FIG. 1, showing possible transmissions in LTE/NR coexistence.

FIG. 1 shows possible transmissions for LTE/NR coexistence for synchronized operation. The LTE timing structure refers to a subframe, the NR timing to a slot. In the example, the numerologies used are the same, such that the NR symbols and symbol time intervals coincide with the LTE symbols and symbol time intervals and have the same durations. Other cases may be considered. Symbols in a slot/subframe are numbered 0 to 13. Depending on the CRS antenna ports used, LTE allows different CRS patterns. Symbols 1 and 8 may carry CRS for 4 antenna ports configured. Currently, according to NR, DMRS may be configured for symbol 2 or 3 (possibilities 1 or 2). As can be seen, for symbol 11, DMRS and CRS overlap in time.

Figure 2:
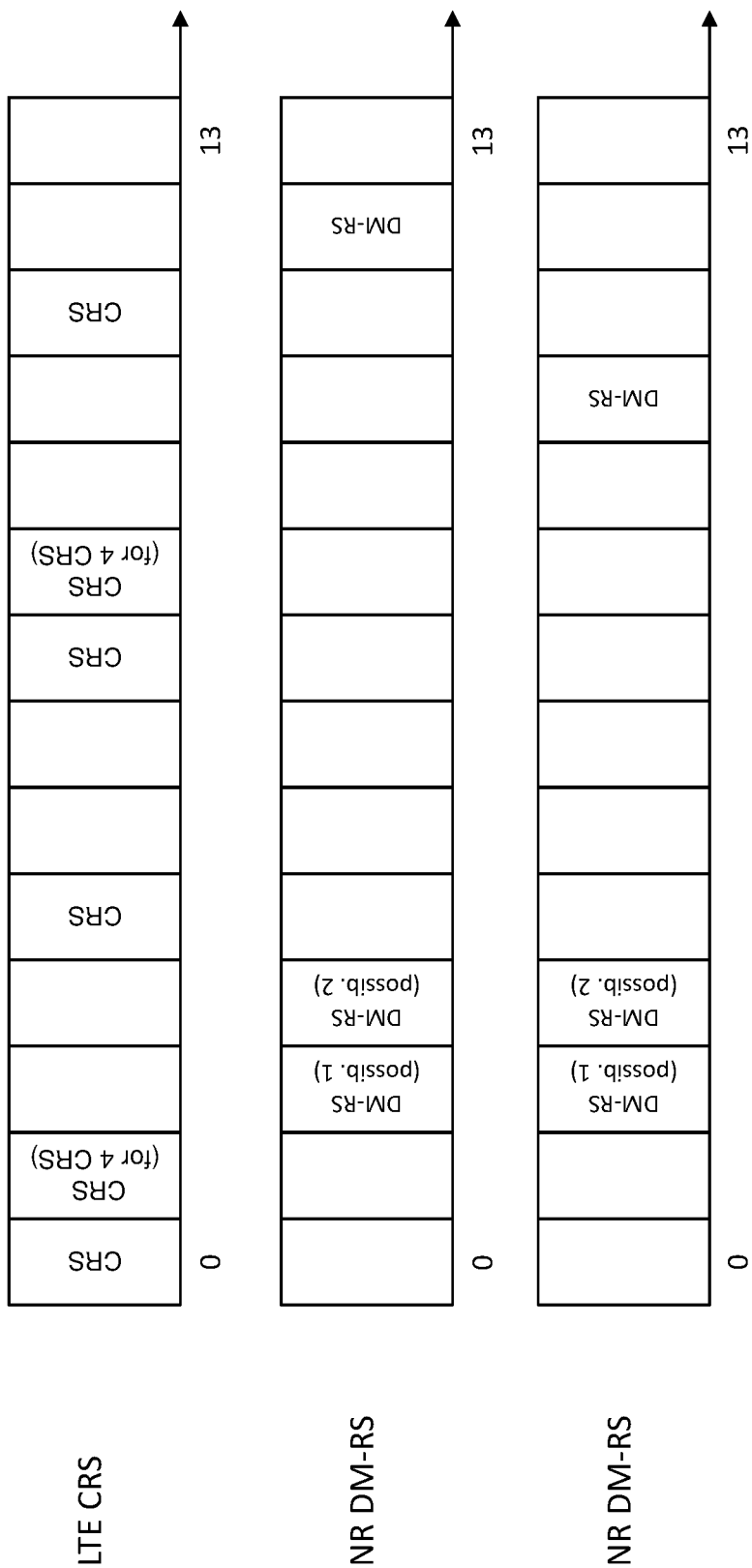
FIG. 2, showing exemplary transmission resource structures for LTE/NR coexistence.

FIG. 2 shows exemplary transmission resource structures avoiding overlap. Such structures may be used based on a coincidence or coordination indication, and/or based on a capacity indication. The upper structure again shows the LTE subframe with CRS pattern. In a first possible selected pattern, the last DMRS symbol may occur after the last CRS, e.g. it may be indicated for slot 12 instead of 11. In another pattern, the last DMRS symbol may occur before the last CRS symbol, e.g. it may be indicated for slot 10 instead of 11. For the first solution, demodulation of the last communication signalings (symbol 13) may be improved, at the cost of possibly less reliable demodulation for earlier communication signaling. For the second solution, demodulation for communication signaling trailing the last DMRS symbol may be negatively impacted, whereas demodulation of earlier communication signaling may be more reliable.

Figure 3:
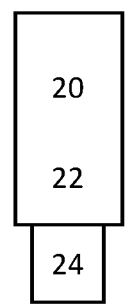
FIG. 3, showing an exemplary radio node implemented as terminal or UE.

FIG. 3 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 4:
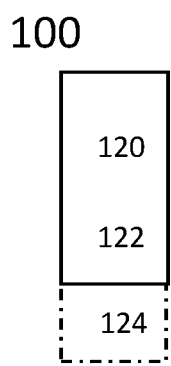
FIG. 4, showing an exemplary radio node implemented as network node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilizing and/or via such intermediate system/s. Providing information may be for radio transmission and/or for transmission via an air interface and/or utilizing a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories and/or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes.

An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilizing, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbors at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, if transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDM | Frequency Division Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RB | Resource Block |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |

| Abbreviation | Explanation |
| --- | --- |
| SNR | Signal-to-noise-ratio |
| SR | Scheduling Request |
| SRS | Sounding Reference Signal(ing) |
| SVD | Singular-value decomposition |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a network node, the network node operating according to a first radio access technology (RAT), the method comprising:
receiving a capability indication indicating a capability of a user equipment to select a Demodulation Reference Signaling (DMRS) pattern from a set of DMRS patterns based at least in part on a coordination indication;
transmitting the coordination indication indicating a presence of cell-specific reference signals (CRS) associated to a second RAT;
selecting the DMRS pattern from the set of DMRS patterns based at least in part on the received capability indication, the selected DMRS pattern corresponding to the transmitted coordination indication; and
transmitting signaling comprising communication signaling and DMRS in a transmission resource pattern, the DMRS being arranged in the transmission resource pattern according to the selected DMRS pattern.

2. The method according to claim 1, wherein the first RAT corresponds to New Radio (NR) technology, and the second RAT corresponds to Long Term Evolution (LTE) technology.

3. The method according to claim 1, wherein the signaling is embedded into the transmission resource structure.

4. The method according to claim 1, wherein the communication signaling is Physical Downlink Shared Channel (PDSCH) signaling.

5. The method according to claim 1, wherein the transmission resource structure has an end symbol which is arranged in one of:
a symbol before an end symbol of a slot; and
a symbol which coincides with the end symbol of a slot.

6. The method according to claim 1, wherein the transmission resource structure is embedded into a slot.

7. The method according to claim 1, wherein the transmission resource structure is one of scheduled to end in and comprises at least one of:
the last symbol of a slot; and
at least one of a long communication signaling and a PDSCH transmission, scheduled to have a duration from symbol n of a slot to symbol m of a slot, wherein at least one of:
n is at least one of:
in the range of 1 to 7; and
corresponds to one of a first half of symbols in a slot; and
wherein m is one of:
12 and 13; and
represents one of a last and a next-to last symbol of a slot.

8. The method according to claim 1, wherein at least one of the coordination indication and the capability indication is provided with higher-layer signaling.

9. A network node configured to operate according to a first radio access technology (RAT), the network node comprising processing circuitry configured to:
receive a capability indication indicating a capability of a user equipment to select a Demodulation Reference Signaling (DMRS) pattern from a set of DMRS patterns based at least in part on a coordination indication;
transmit the coordination indication indicating a presence of cell-specific reference signals (CRS) associated to a second RAT;
select the DMRS pattern from the set of DMRS patterns based at least in part on the received capability indication, the selected DMRS pattern corresponding to the transmitted coordination indication; and
transmit signaling comprising communication signaling and DMRS in a transmission resource pattern, the DMRS being arranged in the transmission resource pattern according to the selected DMRS pattern.

10. A method of operating a user equipment, the user equipment operating according to a first radio access technology (RAT), the method comprising:
transmitting a capability indication indicating a capability of the user equipment to select a Demodulation Reference Signaling (DMRS) pattern from a set of DMRS patterns based at least in part on a coordination indication;
receiving the coordination indication indicating a presence of cell-specific reference signals (CRS) associated to a second RAT;
receiving signaling comprising communication signaling DMRS based on a transmission resource pattern, the DMRS being arranged in the transmission resource pattern according to the DMRS pattern;
selecting the DMRS pattern based at least in part on the received coordination indication, the selected DMRS pattern corresponding to the transmitted capability indication; and
the receiving signaling comprising associating the received signaling with the DMRS based on the selected DMRS pattern.

11. The method according to claim 10, wherein the first RAT corresponds to New Radio (NR) technology, and the second RAT corresponds to Long Term Evolution (LTE) technology.

12. The method according to claim 10, wherein the signaling is embedded into the transmission resource structure.

13. The method according to claim 10, wherein the communication signaling is Physical Downlink Shared Channel (PDSCH) signaling.

14. The method according to claim 10, wherein the transmission resource structure has an end symbol which is arranged in one of:
a symbol before an end symbol of a slot; and
a symbol which coincides with the end symbol of a slot.

15. The method according to claim 10, wherein the transmission resource structure is embedded into a slot.

16. The method according to claim 10, wherein the transmission resource structure is one of scheduled to end in and comprises at least one of:
- the last symbol of a slot; and
- at least one of a long communication signaling and a PDSCH transmission, scheduled to have a duration from symbol n of a slot to symbol m of a slot, wherein at least one of:
  - n is at least one of:
    - in the range of 1 to 7; and
    - corresponds to one of a first half of symbols in a slot; and
  - wherein m is one of:
    - 12 and 13; and
    - represents one of a last and a next-to last symbol of a slot.

17. The method according to claim 10, wherein at least one of the coordination indication and the capability indication is provided with higher-layer signaling.

18. A user equipment configured to operate according to a first radio access technology (RAT), the user equipment comprising processing circuitry being configured to:
- transmitting a capability indication indicating a capability of the user equipment to select a Demodulation Reference Signaling (DMRS) pattern from a set of DMRS patterns based at least in part on a coordination indication;
- receiving the coordination indication indicating a presence of cell-specific reference signals (CRS) associated to a second RAT;
- receive signaling comprising communication signaling and DMRS based on a transmission resource pattern, the DMRS being arranged in the transmission resource pattern according to the DMRS pattern;
- selecting the DMRS pattern based at least in part on the received coordination indication, the selected DMRS pattern corresponding to the transmitted capability indication; and
- the receiving signaling comprising associating the received signaling with the DMRS based on the selected DMRS pattern.

19. A non-transitory computer storage medium storing a computer program comprising instructions that, when executed, cause processing circuitry to at least one of control and perform a method of operating a network node, the network node operating according to a first radio access technology (RAT) the method comprising:
- receiving a capability indication indicating a capability of a user equipment to select a Demodulation Reference Signaling (DMRS) pattern from a set of DMRS patterns based at least in part on a coordination indication;
- transmitting the coordination indication indicating a presence of cell-specific reference signals (CRS) associated to a second RAT;
- selecting the DMRS pattern from the set of DMRS patterns based at least in part on the received capability indication, the selected DMRS pattern corresponding to the transmitted coordination indication; and
- transmitting signaling comprising communication signaling and DMRS in a transmission resource pattern, the DMRS being arranged in the transmission resource pattern according to the selected DMRS pattern.

* * * * *

UNITED STATES PATENT AND TRADEMARK OFFICE
CERTIFICATE OF CORRECTION

PATENT NO. : 11,212,150 B2
APPLICATION NO. : 16/719144
DATED : December 28, 2021
INVENTOR(S) : Baldemair et al.

It is certified that error appears in the above-identified patent and that said Letters Patent is hereby corrected as shown below:

In the Specification

In Column 1, Line 8, delete "2019," and insert -- 2019, now Pat. No. 10,560,297, --, therefor.

In Column 2, Line 56, delete "schedule or" and insert -- scheduled or --, therefor.

In Column 4, Line 43, delete "indicating" and insert -- indication --, therefor.

In Column 4, Lines 49-50, delete "may be" and insert -- may --, therefor.

In Column 5, Line 5, delete "types" and insert -- types of --, therefor.

In Column 8, Line 63, delete "show" and insert -- shows --, therefor.

In Column 11, Line 22, delete "of for" and insert -- for --, therefor.

In Column 12, Line 33, delete "of for" and insert -- for --, therefor.

In Column 12, Line 60, delete "additionally" and insert -- additional --, therefor.

In Column 14, Line 38, delete "(Analog-Digital-Converter," and insert
-- (Analog-to-Digital-Converter, --, therefor.

In Column 15, Line 21, delete "Circuitry)" and insert -- Circuits) --, therefor.

In Column 15, Line 22, delete "Array)," and insert -- Arrays), --, therefor.

In Column 15, Line 46, delete "may be" and insert -- may --, therefor.

In Column 16, Line 43, delete "described" and insert -- describe --, therefor.

Signed and Sealed this
Twelfth Day of December, 2023

Katherine Kelly Vidal
*Director of the United States Patent and Trademark Office*

CERTIFICATE OF CORRECTION (continued)
U.S. Pat. No. 11,212,150 B2

In Column 17, Line 59, delete "be as" and insert -- be --, therefor.

In Column 18, Lines 44-45, delete "message/s" and insert -- message/s. --, therefor.

In Column 19, Line 20, delete "general" and insert -- generally --, therefor.

In Column 23, Line 65, delete "may be" and insert -- be --, therefor.

In Column 26, Line 17, delete "of for" and insert -- for --, therefor.

In Column 27, Line 44, delete "channel/signaling)." and insert -- channel/signaling. --, therefor.

In Column 27, Line 51, delete "etc.)." and insert -- etc. --, therefor.

In Column 28, Line 36, delete "Cross Correlation" and insert -- Auto Correlation --, therefor.

In Column 29, Line 10, delete "Ultra Low Latency High Reliability Communication" and insert -- Ultra-Reliable Low Latency Communication --, therefor.